March 18, 1952 V. M. KINDLUND ET AL Re. 23,472

DEVICE FOR EMBRACINGLY HOLDING GLOVES

Original Filed Aug. 26, 1949

INVENTOR.
VICTOR M. KINDLUND
CLEATUS S. KINDLUND

BY J. A. Grier

ATTORNEY

Reissued Mar. 18, 1952

Re. 23,472

UNITED STATES PATENT OFFICE 23,472

DEVICE FOR EMBRACINGLY HOLDING GLOVES

Victor M. Kindlund and Cleatus S. Kindlund, Englewood, N. J.

Original No. 2,487,339, dated November 8, 1949, Serial No. 112,420, August 26, 1949. Application for reissue March 16, 1950, Serial No. 150,098

1 Claim. (Cl. 24—3)

Matter enclosed in heavy brackets [ ] appears in the original patent but forms no part of this reissue specification; matter printed in italics indicates the additions made by reissue.

This invention relates to improvements in devices for embracingly holding gloves. [and this application is a continuation in part of application Serial No. 749,894, filed May 23, 1947.]

One of the main objects of the invention is the provision of a glove holder which includes a pair of coacting jaw members adapted to embracingly hold a pair of gloves or the like, said jaws being hinged together and having spring means urging them toward each other, each of said jaw members having portions extending beyond the hinged connections and forming handles for urging said jaws apart so that the gloves may be placed between or removed from between said jaws.

Another object of the invention is the provision, in a glove holder of the character described, of protective extremities on said jaws, formed by rolling or curling the ends thereof about inserts.

A further object of the invention is, in a glove holder of the character described, the formation of a rolled or curled end on at least one of said handles, and a generally B-shaped member having a straight longitudinal side journaled in said end, and chains attached to and held apart in spaced relation to each other by the loops of said B-shaped member.

Yet another object is to form rolled or curled ends on both said handles, and to journal the straight leg of a generally O-shaped member in each of said ends, the opposite straight leg of each of said members having a centrally located outwardly extending loop formed therein, to which a chain may be attached, whereby said glove holder may be levelly suspended on a support by means of a chain or chains engaging said loops on both handles.

Other objects and advantages of the invention will be apparent to those skilled in the art.

Referring to the drawings, which illustrate the invention:

Figure 1:
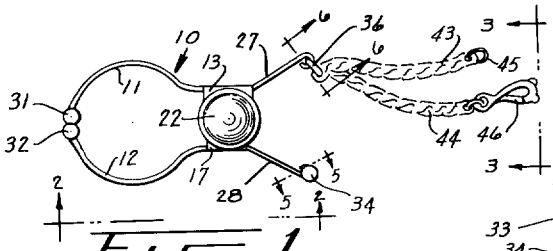
Figure 1 is a view of our new glove holder having a pair of chains connected to one handle thereof.
Figure 3:
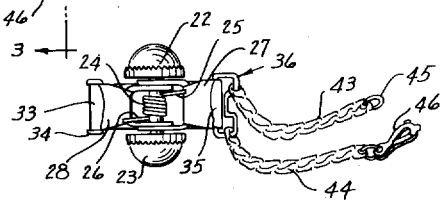
Figure 3 is an end view as seen along the lines 3—3 of Figure 1.
Figure 2:
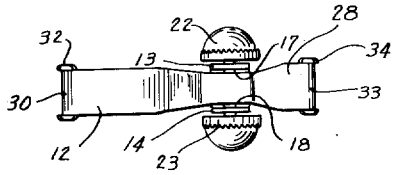
Figure 2 is a view of the glove holder as seen along the lines 2—2 of Figure 1.
Figure 4:
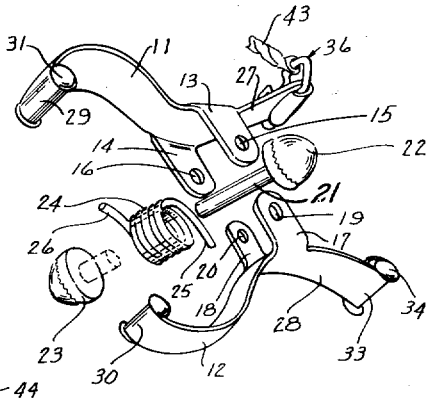
Figure 4 is an exploded view of the glove holder shown in Figure 1.

Referring first to Figures 1 to 4, our improved glove holder 10 includes cooperating jaw members 11 and 12, and although they are shown in the drawings as curved, it will be understood that we may make them any other suitable shapes, for embracingly holding gloves, within the scope of the appended claims. These jaw members are hingedly connected together in the following manner: In Figure 4 it will be seen that the jaw member 11 has, preferably formed integral therewith, spaced parallel lateral ears 13 and 14 having aligned holes 15 and 16 respectively. The jaw member 12 also has similar spaced parallel lateral ears 17 and 18 with aligned holes 19 and 20 therein. The ears 17 and 18 are so spaced apart that they snugly fit between the ears 13 and 14. Now with the holes 15, 19, 20 and 16 in alignment, a pivot pin or shaft 21, forming a working fit with said holes, is inserted and secured therein. The pin or shaft may carry an ornamental head 22, and after it is inserted a second head 23 may be applied, or the shaft 21 may be secured therein in any other suitable manner. Before the shaft is inserted in the aligned holes, a helical spring 24, having straight ends 25 and 26, is positioned between the ears 17 and 18 so that after the shaft 21 passes through the holes 15 and 19, it passes axially through the spring, and then through the holes 20 and 16.

As may best be seen in Figure 3, the straight end 25 of the spring bears against the inner surface of a handle 27, which forms an extension of the jaw member 11, while the straight end 26 bears against the inner surface of a handle 28, which forms an extension of the jaw member 12, and consequently the ends 29 and 30 of the jaw members are constantly urged together.

Figure 5:
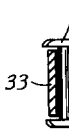
Figure 5 is a view, partly in section and taken along the lines 5—5 of Figure 1.

The end 29 of the jaw member is curled or rolled to embrace an insert 31, likewise the end 30 of the jaw member is curled or rolled to embrace an insert 32, and also the end 33 of the handle 28 is curled or rolled to embrace an insert 34. At all three of these points, the inserts are preferably embraced tightly so that they cannot move independently of the portions embracing them. In Figure 5, one form of insert 34 is shown in the form of a dumb-bell, but we may employ inserts of any other form, made of any suitable material.

The end 35 of the handle 27 is curled or rolled, and journaled therein is the straight side 37 of a member 36 which is shaped somewhat like the letter B, with the following exceptions: The member 36 has a depression 38 formed in the side opposite the side 37, which depression clears the rolled surface 35, and yet the space between is too narrow for a chain to pass through it. On each side of the depression 38 are aligned portions 39 and 40 spaced sufficiently from the rolled portion 35 of the handle to provide loops 41 and 42, to which chains such as the chains 43 and 44 respectively may be attached. The chain 43 carries on its extremity an eye or ring 45, with which a reversed hook locking device 46, carried on the end of the chain 44, may be engaged after one of them has been passed around or through a supporting member. For example, one of the chains may be passed around the handle of, or through the handle ring of a woman's hand bag, and then the locking device 46 is engaged with the eye 45, thereby securing the glove holder to the hand bag.

To place the gloves in the holder, the handles 27 and 28 are pressed towards each other, opening the jaw members 11 and 12, and the gloves are then positioned between the jaw members and held there with one hand until the other hand releases the handles and allows the jaw members 11 and 12, under the urge of the spring 24, to move towards each other and embracingly hold the gloves. To remove them, the handles are pressed towards each other with one hand, and with the other hand remove the gloves.

Figure 8:
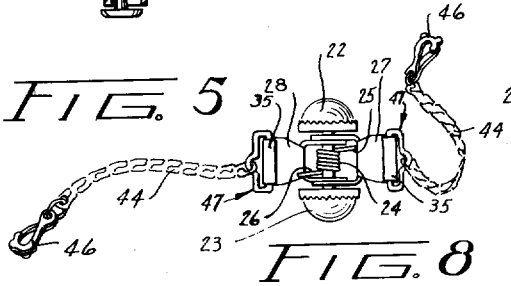
Figure 8 is an end view similar to Figure 3 except that the ends of the handles are provided with members like that shown in Figure 7 to accommodate single chains.
Figure 6:
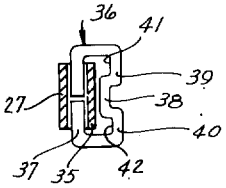
Figure 6 is an enlarged detailed view, partly in section and taken along the lines 6—6 of Figure 1.
Figure 7:
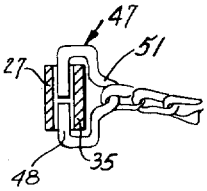
Figure 7 is an enlarged detailed view showing a modification of the arrangement shown in Figure 6, to accommodate a single chain instead of two chains.

In Figures 7 and 8, a modification is shown wherein the end 35 of the handle 27 is rolled, and journaled therein is the straight side 48 of a member 47. The opposite side of this member is closely adjacent to, and yet clears the outer surface of the rolled end 35, except in the center, where an outwardly directed curved portion, provides between itself and the rolled end, a single loop 51 which accommodates a single chain. In Figure 8, a chain such as the chain 44 is shown engaging this single loop journaled in the rolled end of the handle 27. The rolled end 35 of the handle 28 may also have an identical member 47 journaled therein to accommodate another chain, or the other end of the same chain. In Figure 8, we show a second chain 44 engaging such identical member, to suggest that if the chains are suspended from a level support, the gloves held thereby will be generally horizontally disposed.

It will be understood that we may make numerious changes in the arrangements shown and described herein, within the scope of the following claims.

We claim:

[1. In a glove holder in combination, a pair of coacting jaw members hinged together and having free ends normally contacting each other, said jaws being shaped to conjointly form a glove-receiving hollow between said ends and the point where said jaw members are hinged together, spring means urging said jaw members toward each other, and extensions on each of said jaw members forming handles, said free ends of said jaw members being rolled, and inserts carried in said rolled ends reinforcing the same.]

2. In a device for holding gloves comprising spring hinged jaws having extensions thereon forming handles, the end of at least one of said handles being rolled, a generally B-shaped attaching member having a straight side embraced by said rolled end, and the opposite side of said member having spaced loops formed therein to which chain means may be secured.

VICTOR M. KINDLUND.
CLEATUS S. KINDLUND.

REFERENCES CITED

The following references are of record in the file of this patent or the original patent:

UNITED STATES PATENTS

| Number | Name | Date |
|---|---|---|
| 660,545 | Heineman | Oct. 23, 1900 |
| 781,629 | Ahlstrom | Feb. 7, 1905 |
| 831,627 | Pickens | Sept. 25, 1906 |
| 1,486,443 | Lutz | Mar. 11, 1924 |
| 2,163,208 | Moody | June 20, 1939 |
| 2,180,726 | Bradley | Nov. 21, 1939 |
| 2,296,084 | Bloom | Sept. 15, 1942 |

FOREIGN PATENTS

| Number | Country | Date |
|---|---|---|
| 54,968 | Switzerland | Sept. 13, 1911 |